United States Patent [19]
Mase

[11] Patent Number: 5,178,571
[45] Date of Patent: Jan. 12, 1993

[54] METHOD FOR MANUFACTURING AN ELECTRO-OPTICAL DEVICE

[75] Inventor: Akira Mase, Aichi, Japan

[73] Assignee: Semiconductor Energy Laboratory Co., Ltd., Kanagawa, Japan

[21] Appl. No.: 803,223

[22] Filed: Dec. 6, 1991

[30] Foreign Application Priority Data

Dec. 20, 1990 [JP] Japan .................................. 2-418128

[51] Int. Cl.$^5$ .............................................. H01J 9/26
[52] U.S. Cl. ........................................ 445/24; 445/25; 427/66; 359/52
[58] Field of Search ............... 445/24, 25, 38; 359/51, 359/52; 427/66

[56] References Cited

U.S. PATENT DOCUMENTS

| | | | |
|---|---|---|---|
| 3,852,092 | 12/1974 | Patterson et al. | 359/52 |
| 4,878,741 | 11/1989 | Fergason | 359/98 |
| 4,902,929 | 2/1990 | Toyoda et al. | 427/66 |
| 5,011,624 | 4/1991 | Yamagishi et al. | 359/52 |
| 5,056,898 | 10/1991 | Ma et al. | 359/103 |

Primary Examiner—Richard K. Seidel
Assistant Examiner—Jeffrey T. Knapp
Attorney, Agent, or Firm—Sixbey, Friedman, Leedom & Ferguson

[57] ABSTRACT

A method for manufacturing an electro-optical device is disclosed. The first step of the method is distributing on a substrate at a thickness of 1 to 500 pm a mixture which comprises spacers having a diameter of 1 to 50 pm and plastic spherical covers having an inner diameter of 0.2 to 50 pm and containing a liquid crystal therein and coated with heat curable resin or photocurable resin or a polymerizable material on the outside surfaces thereof. Secondly, the substrate is joined to another substrate with the distributed mixture therebetween. Finally, the joined substrates are pressed against each other under an environmental pressure less than atmospheric pressure. In case of the heat curable resin, said pressing step is carried out with the substrates heated. In case of the photocurable resin, said pressing step is carried out with the distributed mixture irradiated with light. In case of the polymerizable, material, the material is polymerized during said pressing step. Liquid crystal devices having a more distinct threshold value and hence having an increased drive margin are realized.

23 Claims, 6 Drawing Sheets

F I G. 3
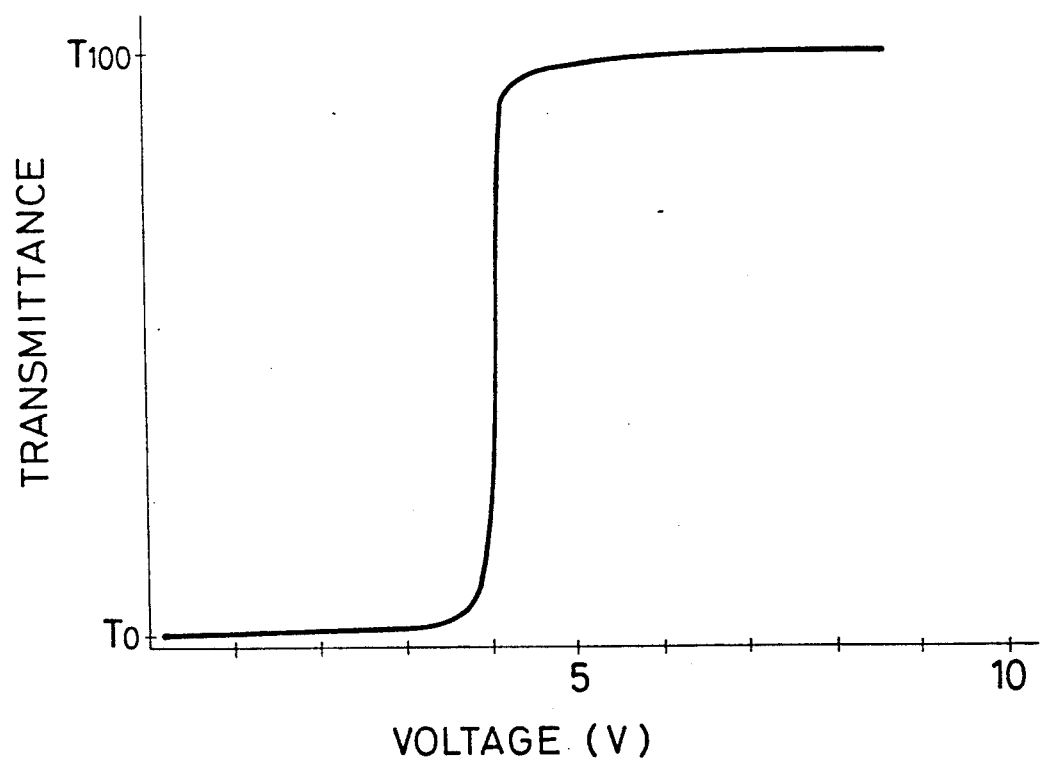

METHOD FOR MANUFACTURING AN ELECTRO-OPTICAL DEVICE

BACKGROUND OF THE INVENTION

1. Field of the Invention

The present invention relates to a method for manufacturing an electro-optical device which can be readily scaled up into a large area. The electro-optical device according to the present invention is useful as a screen for shielding visual field of windows and show windows, as a light-control curtain, and as a liquid crystal display which displays and electrically converts characters, figures, symbols, and the like.

2. Description of the Prior Art

Liquid crystal display devices heretofore used widely in practice include those using nematic liquid crystals, i.e., the TN (twisted nematic) mode or the STN (supertwisted nematic) mode liquid crystals. There has also been proposed recently a liquid crystal display device using a ferroelectric liquid crystal. However, it is requisite for the devices mentioned above to use a polarizer sheet and to impart molecular orientation so that the liquid crystal molecules may arrange regularly along one direction. On the other hand, there is also known a dispersion type liquid crystal device which realizes a bright display having a high contrast without using any polarizer sheets nor applying such an orientation treatment to the molecules. A dispersion type liquid crystal device comprises a transparent solid polymer having dispersed therein nematic, cholesteric, or smectic liquid crystals in granules or in sponges. A method for fabricating such a liquid crystal device comprises dispersing liquid crystals in a polymer by encapsulating the liquid crystal, and then applying the resulting polymer as a thin film on a substrate or a film. The substances proposed to use in the encapsulation include gelatin, gum arabic, polyvinyl alcohol, and the like.

According to the encapsulating technique set forth above, the liquid crystal molecules having encapsulated in poly(vinyl alcohol) arrange themselves along the electric field when an electric field is applied, provided that the molecules have a positive dielectric anisotropy in the thin film. In such a case, the thin film turns transparent if the refractive index of the liquid crystal is equal to that of the polymer. When no electric field is applied, the liquid crystal molecules are in random orientation. Thus, the thin film turns opaque since the light cannot be transmitted due to scattering. In addition to the one exemplified above, there are known also other liquid crystal devices comprising a thin film or a film of a polymer having dispersed therein encapsulated liquid crystals. For example, there is known a liquid crystal display device comprising an epoxy resin matrix having dispersed therein liquid crystal materials, a liquid crystal display device which utilizes phase separation between a liquid crystal and a photocurable substance, or a liquid crystal display device which comprises a three-dimensional polymer structure being impregnated with a liquid crystal. Those liquid crystal electro-optical devices described above are collectively referred to hereinafter as dispersion type liquid crystal devices.

One of the factors which determine the device characteristics of a dispersion type liquid crystal device is the area in which the liquid crystal is present. In a device comprising the liquid crystal in capsules, the degree of dispersion of these capsules is important; if the device is a one using a polymer, the degree of dispersion of the space within the polymer becomes of concern. It has been desired to achieve uniform dispersion of the liquid crystal, since a nonuniform dispersion of the liquid crystal causes heterogeneous transmission of the light in the display, which leads to an irregular image display or an uneven contrast.

SUMMARY OF THE INVENTION

An object of the present invention is to overcome the problems mentioned above and to provide an electro-optical device, particularly a dispersion type liquid crystal electro-optical device comprising uniformly dispersed liquid crystals.

This and other objects of the present invention have been attained by a method for manufacturing an electro-optical device, which comprises the steps of:

preparing spherical capsules (spherical covers) containing therein at least a liquid crystal material, and coating the surfaces of said capsules (covers) with a heat curable resin or a photocurable resin or a material to become a polymer;

establishing on a substrate, a layer comprising liquid crystal having dispersed therein, by distributing a mixture comprising the capsules (covers) and spacers on the substrate, or by spray-coating the substrate with a solution comprising the capsules (covers) having dissolved in a solvent such as an alcohol and Freon, or by directly scattering (distributing) the capsules (covers) on the substrate in a dry state without using any solvent, or by printing or spin-coating the substrate with an organic solvent having dispersed therein the capsules (covers);

applying a pressure to the substrates with the mixture or the solution or the capsules or the organic solvent between the substrates to establish a predetermined spacing between the substrates while polymerizing the resin or the material to become a polymer, to thereby reduce the scattering of the average distance between the capsules (covers) and thereby fix the position of the liquid crystal material between the substrates. In the establishing step, spacers can be dispersed in the layer together with the liquid crystal. In such a case, spacers are used together with the liquid crystal in the distribution or the spray-coating or the scattering or the printing or spin coating with the spacers mixed with the liquid crystal. For example, the spacers have a diameter of 1 to 50 $\mu$m. In the spray-coating method, the residual solvent and atmospheric gas on the substrate can be removed by reducing the environmental pressure. Furthermore, one of the substrates is superposed on the other under reduced pressure with the layer therebetween and then the substrates are pressed against each other under reduced pressure, so that the spacing between the substrates can be controlled to have a constant value by the spacers.

In the case where the surfaces of the spherical capsules (spherical covers) are coated with the material to become a polymer, a method for manufacturing an electro-optical device in accordance with this case of the present invention comprises the steps of:

distributing on a substrate at a thickness of 1 to 500 $\mu$m a mixture which comprises spacers having a diameter of 1 to 50 $\mu$m and plastic spherical covers having an inner diameter of 0.2 to 50 $\mu$m and containing a liquid crystal therein and coated with a material to become a polymer on the outside surfaces thereof;

joining said substrate with another substrate with the distributed mixture therebetween;

pressing the substrates against each other under a reduced pressure; and changing said material into said polymer during said pressing step.

BRIEF DESCRIPTION OF THE DRAWINGS

FIG. 3 is a graph showing the voltage-transmittance characteristic of a liquid crystal electro-optical device according to the present invention;

DETAILED DESCRIPTION OF THE PRESENT INVENTION

The present invention is described in further detail below referring to non-limiting examples.

EXAMPLE 1

Figure 6:
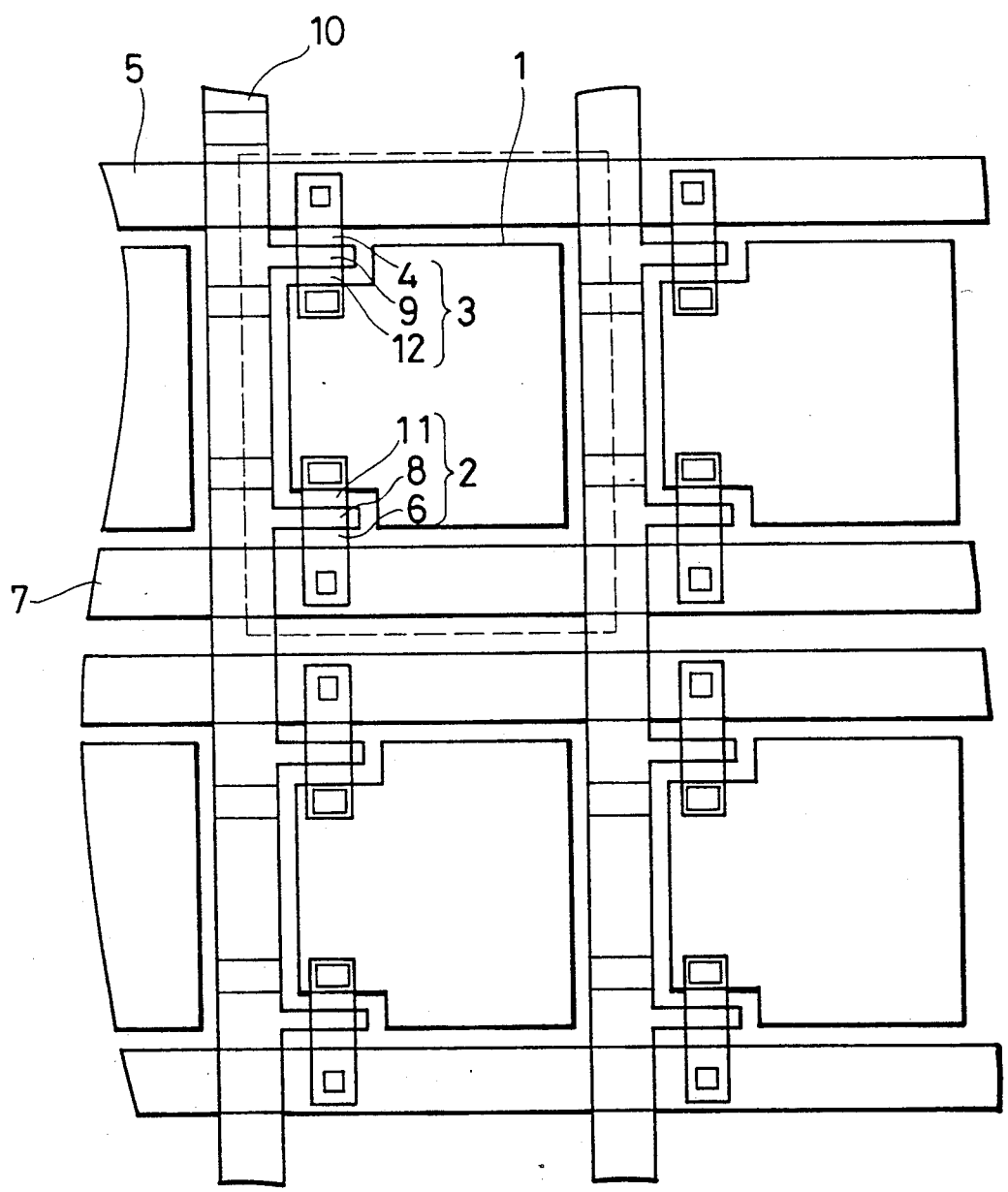
FIG. 6 shows a complementary active matrix substrate used in the liquid crystal electro-optical device according to the present invention.

Referring to FIG. 6, a first substrate having provided thereon an electric circuit is explained. On a first substrate 20 are established an N channel thin film transistor 2 and a P channel thin film transistor 3 at a complementary structure with respect to a pixel electrode 1 provided on the substrate. A source (drain) portion 4 of the P channel thin film transistor is connected to a first signal line 5 selected from a pair of signal lines, while a source (drain) portion 6 of the N channel thin film transistor is connected to a second signal line 7 of the pair of signal lines. Gate electrodes 8 and 9 of the N channel thin film transistor and the P channel transistor are connected to a common third signal line 10, and drain (source) portions 11 and 12 of the N channel thin film transistor and the P channel thin film transistor are connected to the pixel electrode 1. Thus is obtained an electric circuit on the first substrate as shown in FIG. 6.

Figure 1:
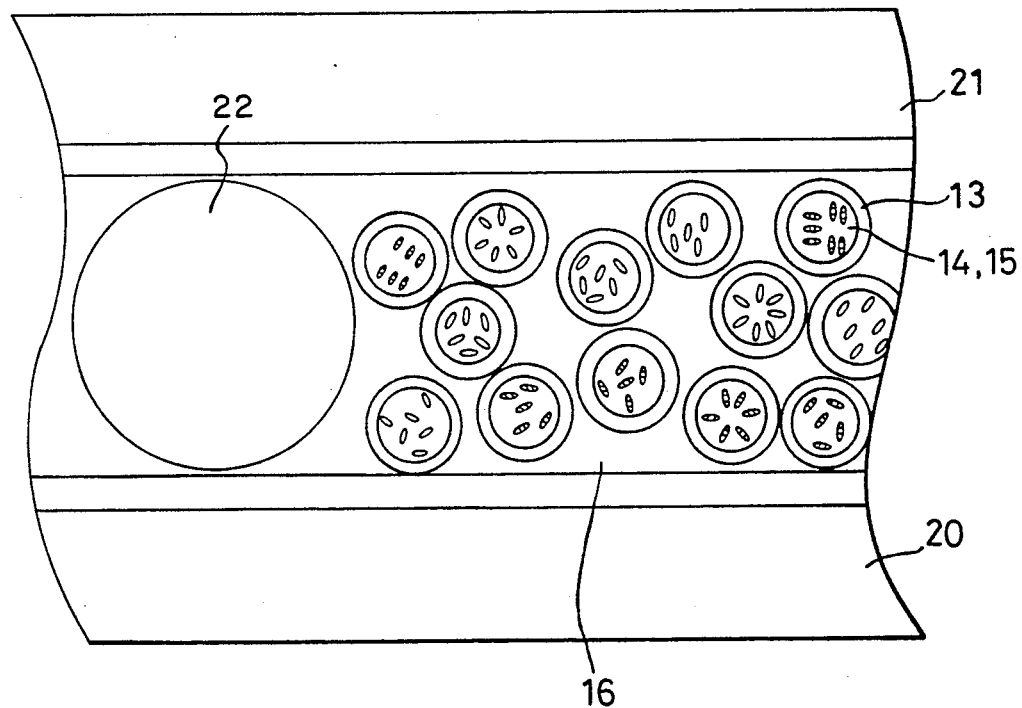
FIG. 1 is a cross sectional view of a liquid crystal electro-optical device according to the present invention.
Figure 2:
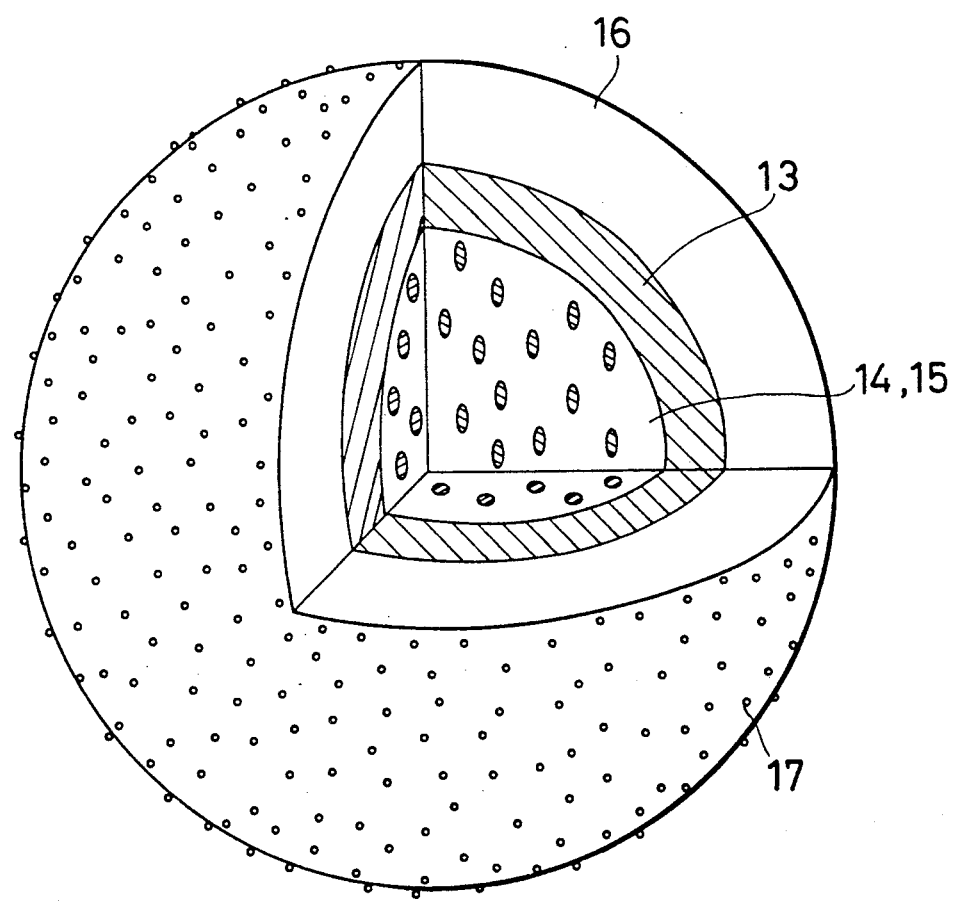
FIG. 2 is a schematic view of a liquid crystal microcapsule used in a liquid crystal electro-optical device according to the present invention.

After setting the first substrate above on a horizontal plane, isopropanol having dispersed or dissolved therein microcapsules of a nematic liquid crystal therein was distributed from an upper position on the surface of said first substrate. Now referring to FIG. 1, the liquid crystal electro-optical device according to an embodiment of the present invention is explained. The microcapsule of a nematic liquid crystal used herein comprises a nematic liquid crystal composition 14 and a coloring matter 15, e.g. a black dye, having encapsulated in a plastic spherical capsule (cover) 13 made of poly(vinyl alcohol) having an outer diameter of 2 μm and an inner diameter of 1 μm, which is further coated with a 2 μm thick epoxy resin layer 16. On the surface of the epoxy resin layer is further scattered silica particles 17 from 100 to 200 Å in diameter to improve higher dispersion in the solution. Spacers 22 can be dispersed in the layer together with the liquid crystal. In FIG. 2 is shown schematically the plastic capsule (cover) used in the present invention.

The distributed isopropanol had a film form at a thickness of 10 to 20 μm, which was measured immediately after the distribution. The thickness may be from 1 to 500 μm. After the distribution, a second substrate 21 was aligned with the first substrate in a pressure-reduced chamber, and the substrates were pressed together under pre-heating at 80° C. and a pressure of 100 Pa, while applying pressure of 2 kg/cm$^2$ to the substrates.

The laminate of the substrates thus obtained was taken out from the chamber, and 10 sets of them were baked at one time at 180° C. for an hour under pressure to cure the epoxy resin. To each of the lead portions of the substrates was connected a driving IC (integrated circuit) having mounted by TAB (tape automated bonding), to thereby evaluate the device characteristics. The voltage-transmittance curve thus obtained is given in FIG. 3. It can be seen therefrom that a clear threshold value is obtained, which could never be attained by a conventional dispersion type liquid crystal device. Though an active device is used in this example to drive the dispersion type liquid crystal, a simple matrix liquid crystal electro-optical device is also practically feasible, since such a distinct threshold value is obtained.

COMPARATIVE EXAMPLE

Figure 4:
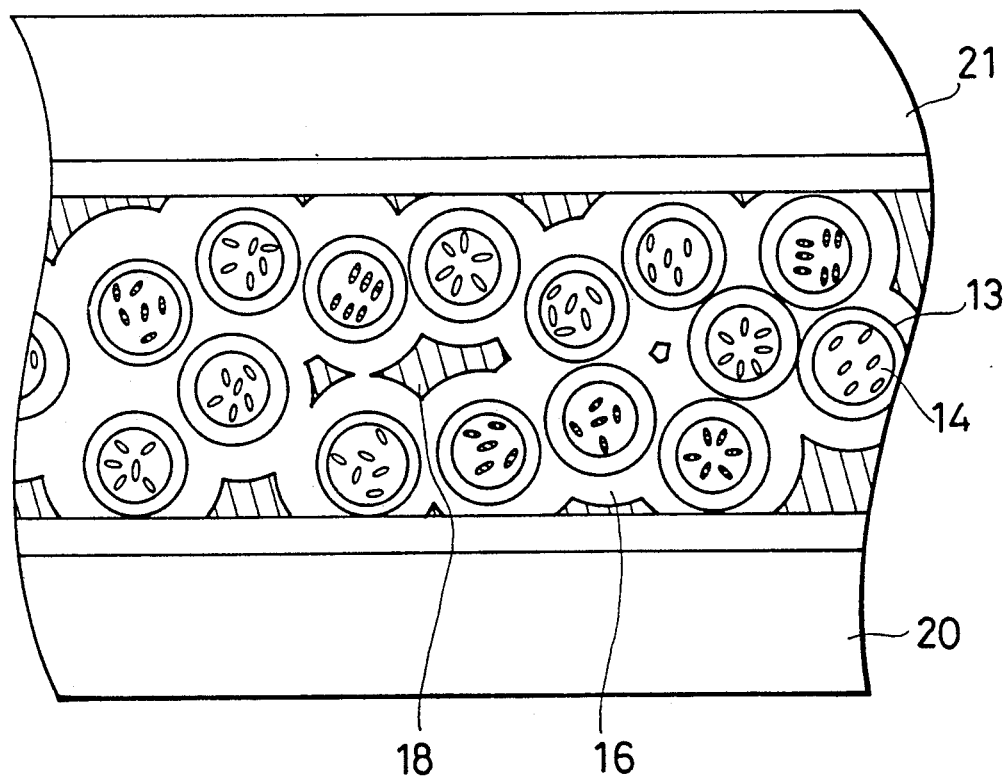
FIG. 4 is a cross sectional view of a liquid crystal electro-optical device of a comparative example.

Referring to FIG. 4, a comparative liquid crystal device obtained by laminating the substrates under atmospheric pressure is explained. The device fabrication process was the same as that used in EXAMPLE 1 described hereinabove, except that after scattering silica particles over the epoxy resin layer of the microcapsules, the substrates were laminated under atmospheric pressure. It can be seen that the resulting device suffers considerable formation of voids 18 within the liquid crystal layer after pressing, and that the optical characteristics thereof are degraded due to the capture of atmospheric gas or the residual alcohol solvent.

By comparing the liquid crystal device according to the present invention (see FIG. 1) with the comparative one (FIG. 4), it is clear that, in the device of the present invention, the capsule (cover) 13 containing the liquid crystal 14 therein is uniformly distributed in the space between the substrates 20 and 21. In addition, the lamination under a reduced pressure according to the present invention completely excludes such voids observed in the comparative device shown in FIG. 4. Furthermore, since the liquid crystal material and a dye material 15 are mixed in the microcapsules in the present invention, distinct ons and offs can be observed on the display.

EXAMPLE 2

A simple matrix liquid crystal electro-optical device was fabricated. On a first substrate was provided a 1000 Å thick ITO (indium tin oxide) film by sputtering, which was fabricated by photolithography into 400 scanning side electrodes at a width of 300 μm and a pitch of 30 μm.

After setting the first substrate fabricated above on a horizontal plane, microcapsules of nematic liquid crystals were scattered thereon from the upper position of the substrate. No solvent was used in this case, but merely the difference in pressure was utilized for the scattering.

The microcapsules used in the present example comprise plastic spherical capsules (covers) of poly(vinyl alcohol) each having an outer diameter of 4 μm and an inner diameter of 2 μm, having sealed therein a cholesteric liquid crystal material. The outer surface of each of the microcapsules is further coated with a 2 μm thick denatured acrylic resin. Since the liquid crystal microcapsules are sprayed in a dry state in the present example, silica particles from 100 Å to 200 Å in diameter were scattered on the surface of the acrylic resin coated on the microcapsules to avoid aggregation of the liquid crystal microcapsules and to ensure homogeneous dispersion thereof. By the scattering, microcapsules were accumulated to a thickness of about 10 to 20 μm on the first substrate.

The first substrate on which the microcapsules have been scattered was aligned with a second substrate in a pressure-reduced chamber, and pressed together to obtain a laminate. The second substrate was similar to the first, which comprised 640 electrodes obtained by a photolithographic processing of an ITO film having deposited by sputtering.

The lamination of the substrates was conducted under preheating at 80° C. and at a pressure of 100 Pa, while applying a pressure of 2 kg/cm² to the substrates and irradiating the accumulated microcapsules with ultraviolet (UV) light at an output of 1000 mJ.

Figure 5:
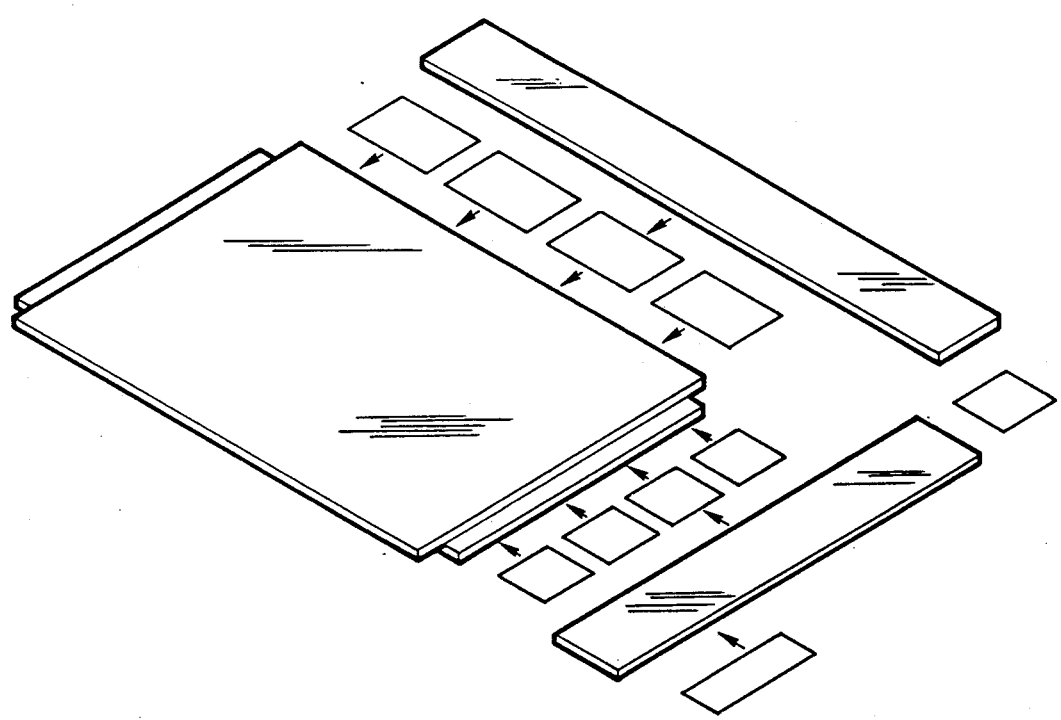
FIG. 5 is an explanatory view of a construction of the devices according to the present invention.

To each of the substrates of the resulting laminate was connected a driving IC obtained by TAB to evaluate the device characteristics. The assembly is shown in FIG. 5.

Thus, as illustrated by the foregoing examples, dispersion type liquid crystal devices having a uniform dispersion of liquid crystals were realized by a fabrication process comprising previously coating the surface of microcapsules having enclosed therein the liquid crystal with a resin having a binder effect, and thereafter distributing said microcapsules on a substrate, and thereafter joining the substrate with another substrate, followed by curing the resin while applying a pressure to the substrates. Accordingly, when compared with the conventional polymer network type liquid crystal electro-optical devices comprising a polymer resin and a liquid crystal composition, liquid crystal devices having a more distinct threshold value and hence having an increased drive margin were obtained.

While the invention has been described in detail and with reference to specific embodiments thereof, it will be apparent to one skilled in the art that various changes and modifications can be made therein without departing from the spirit and scope thereof. Examples of such modifications are as follows.

The inner diameter of the plastic capsule (cover) may be from 0.2 to 50 μm.

What is claimed is:

1. A method for manufacturing an electro-optical device comprising the steps of:
   distributing on a substrate at a thickness of 1 to 500 μm a mixture which comprises spacers having a diameter of 1 to 50 μm and plastic spherical covers having an inner diameter of 0.2 to 50 μm and containing an electrically responsive liquid crystal therein, at least said covers coated with heat curable resin on the outside surfaces thereof;
   joining said substrate with another substrate with the distributed mixture therebetween; and
   pressing the substrates against each other with the substrates heated, whereby said heat curable resin is cured to fix the positions of said covers with respect to said substrates.

2. The method of claim 1 wherein the distributed mixture has a film form.

3. The method of claim 1 wherein said plastic spherical covers contain coloring matter therein together with said liquid crystal.

4. The method of claim 1 wherein said distributing step is carried out by dissolving said mixture in a solvent followed by distributing the solution on said substrate.

5. The method of claim 1 wherein said distributing step is carried out without dissolving said mixture in a solvent.

6. The method of claim 1 wherein said distributing step is carried out by dispersing said mixture in an organic solvent followed by applying the dispersion on said substrate by printing or spincoat.

7. The method of claim 1 wherein a silica particle is provided on the surface of said heat curable resin.

8. A method for manufacturing an electro-optical device comprising the steps of:
   distributing on a substrate at a thickness of 1 to 500 μm a mixture which comprises spacers having a diameter of 1 to 50 μm and plastic spherical covers having an inner diameter of 0.2 to 50 μm and containing an electrically responsive liquid crystal therein, at least said covers coated with photocurable resin on the outside surfaces thereof;
   joining said substrate with another substrate with the distributed mixture therebetween; and
   pressing the substrates against each other with the distributed mixture irradiated with light, whereby said photocurable resin is cured to fix the positions of said covers with respect to said substrates.

9. The method of claim 8 wherein the distrubuted mixture has a film form.

10. The method of claim 8 wherein said plastic spherical covers contain coloring matter therein together with said liquid crystal.

11. The method of claim 8 wherein said distributing step is carried out by dissolving said mixture in a solvent followed by distributing the solution on said substrate.

12. The method of claim 8 wherein said distributing step is carried out without dissolving said mixture in a solvent.

13. The method of claim 8 wherein said distributing step is carried out by dispersing said mixture in an organic solvent followed by applying the dispersion on said substrate by printing or spincoat.

14. The method of claim 8 wherein a silica particle is provided on the surface of said photocurable resin.

15. A method for manufacturing an electro-optical device comprising the steps of:
   distributing on a substrate at a thickness of 1 to 500 μm a mixture which comprises spacers having a diameter of 1 to 50 μm and plastic spherical covers having an inner diameter of 0.2 to 50 μm and containing an electrically responsive liquid crystal therein, at least said covers coated with a polymerizable material on the outside surfaces thereof;
   joining said substrate with another substrate with the distributed mixture therebetween; and
   pressing the substrates against each other; and
   polymerizing said material during said pressing step to fix the positions of said covers with respect to said substrates.

16. The method of claim 15 wherein the distributed mixture has a film form.

17. The method of claim 15 wherein said plastic spherical covers contain coloring matter therein together with said liquid crystal.

18. The method of claim 15 wherein said distributing step is carried out by dissolving said mixture in a solvent followed by distributing the solution on said substrate.

19. The method of claim 15 wherein said distributing step is carried out without dissolving said mixture in a solvent.

20. The method of claim 15 wherein said distributing step is carried out by dispersing said mixture in an organic solvent followed by applying the dispersion on said substrate by printing or spincoat.

21. The method of claim 1 wherein said pressing step is performed at an environmental pressure less than atmospheric pressure.

22. The method of claim 8 wherein said pressing step is performed at an environmental pressure less than atmospheric pressure.

23. The method of claim 15 wherein said pressing step is performed at an environmental pressure less than atmospheric pressure.

* * * * *